June 4, 1968 W. J. SKILES 3,387,101

IDENTIFIER FOR TWO-WAY MOBILE TRANSMITTERS

Filed Oct. 20, 1965 2 Sheets-Sheet 1

INVENTOR.
William J. Skiles,
BY John H. [illegible],
his ATTORNEY

INVENTOR

William J. Skiles,

BY

John H. Leonard, his ATTORNEY

United States Patent Office 3,387,101

Patented June 4, 1968

3,387,101

IDENTIFIER FOR TWO-WAY MOBILE TRANSMITTERS

William J. Skiles, 4329 W. 131st St., Cleveland, Ohio 44135

Filed Oct. 20, 1965, Ser. No. 498,532
3 Claims. (Cl. 179—100.2)

ABSTRACT OF THE DISCLOSURE

The identifier of the present invention comprises a power driven turntable by which is carried a magnetic recording substance disposed in a path coaxial with the axis of rotation of the turntable, and a magnetic pick-up is disposed for scanning said path for picking up the message magnetically recorded by said substance so as to repeat the same recorded message for each complete rotation of the turntable. The magnetic recording substance is in fixed position on, and rotatable with, the turntable. Time delay means in the circuit are operative to disconnect the circuit from the source at the end of a predetermined time interval following energization of the circuit. Also, time delay means are provided to connect the turntable drive in the circuit at the end of a predetermined interval following energization of the circuit. Thus, the device can be associated with a microphone broadcasting circuit and connected thereto so that when the microphone has remained on for a predetermined length of time the identifier starts operating and after the microphone circuit has been energized for a predetermined length of time after the identifier has started, the identifier stops.

In present day automobile fleets, it is common practice to provide each vehicle with a radio transmitter and receiver with which it can transmit messages to, and receive messages from, a central broadcasting station. Generally such systems are provided in police patrol vehicles, taxicabs, and other vehicles wherein operating conditions require prompt communication between the vehicles and central station at all times.

In cases of mishandling or malfunctioning of the transmitting equipment of any vehicle, it quite often happens that the circuit of the transmitter will be on for longer periods of time than prescribed, thus rendering the communications system ineffective for other vehicles of the fleet. When this occurs, the central station cannot correct the situation until the particular offending vehicle has been located.

Again, in some cases, the operator of a vehicle may become irritated and deliberately turn on his transmitter and leave it on, thus blocking communication with other vehicles.

To locate such an offending vehicle by the usual triangulation methods is very time consuming, and in the case of police patrol vehicles and the like, the delay imposes dangers on the personnel of other vehicles who are relying upon the system for instant communication with headquarters.

The present identifier reduces the dangers resulting from such mishandling, malfunctioning, or misuse of the system. It is so arranged that after the transmitting circuit on a vehicle has remained on for a period slightly longer than that which is normally allowed for sending messages to the central station or for two-way conversations, the present identifier automatically becomes activated and transmits to the central station a message identifying the vehicle. The identifying message informing the central station of the identity of the vehicle preferably is transmitted in by-passing relation to the microphone circuit of the transmitter regardless of the actions or knowledge of the operator. Since the central station is continuously scheduling the vehicles from one locale to another, it usually can place the location of the offending vehicle, thus identified, within a reltively small segment of the patrolled area so that, immediately upon the identifying message being received, other vehicles can be sent to that limited segment and promptly locate the vehicle and correct the difficulty or assist the operator of the vehicle in the current emergency.

The principal object of the present invention is to provide an identifier for identifying to the central station a vehicle of which the transmitter remains on the air for periods longer than those preselected by the central station.

Another object of the present identifier is to provide a concealed foot or hand switch which can be operated inconspicuously by the vehicle operator in case of robbery or emergency which precludes him from using the microphone of the transmitter and which, when operated, activates the identifier, whereupon it sends to the central station the identification of the vehicle so that the central station is made aware of an emergency involving the vehicle and can send other vehicles to its rescue.

The present invention is not concerned with the details of the specific transmitting and receiving sets currently used in two-way communication systems for such vehicles as such sets are readily obtainable on the market. Instead, the present invention is directed to an identifier for supplying an identifying message over the vehicle transmitting set independently of the operator's desires under certain conditions, and in accordance with the operator's desires under other and different conditions. It is directed more specifically to the manner in which the identifier is connected with the transmitting set through time delay means which, when the microphone talking, or broadcasting, switch has been closed for a period greater than a preselected time interval, connects the identifier to the transmitter set and turns on the transmitter, and delivers an identification message thereto for broadcasting to the central station.

Various specific objects and advantages of the invention will become apparent from the following description wherein reference is made to the drawings, in which.

Figure 1:
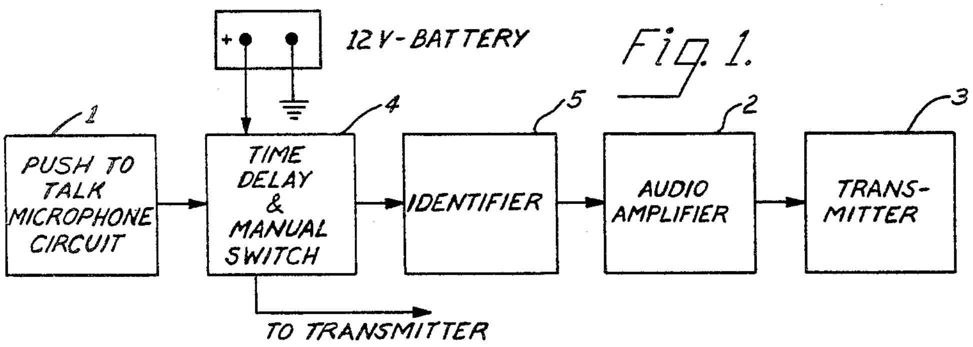
FIG. 1 is a block diagram showing in general the connection of the identifier with a conventional transmitter-receiver set of a vehicle.

Referring to FIG. 1, a conventional radio sending and transmitting set used in police patrol vehicles, with the identifier of the present invention connected thereto, is shown for purposes of illustration.

The set comprises a conventional microphone circuit 1, which is equipped with the usual push button switch which is pushed to make contact for transmitting and released for receiving. Such a microphone circuit 1 is referred to as a "push-to-talk" circuit and, when the push button switch is closed, it connects a source of voltage to an audio-amplifier 2, which is connected to a transmitter 3, and also turns on the transmitter 3.

In accordance with the present invention, a time delay switch mechanism 4 is interposed between the microphone circuit 1 and the audio-amplifier 2. Interposed between the time delay switch mechanism 4 and the audio-amplifier 2 is an identifier 5 embodying the principles of the present invention.

As mentioned, the microphone circuit 1, audio-amplifier 2 and transmitter 3 are conventional in the art and readily available on the market, and when the microphone circuit is energized for transmitting by closing the push-to-talk switch, a suitable switching relay is energized to close its contacts and energize the transmitter 3.

Figure 2:
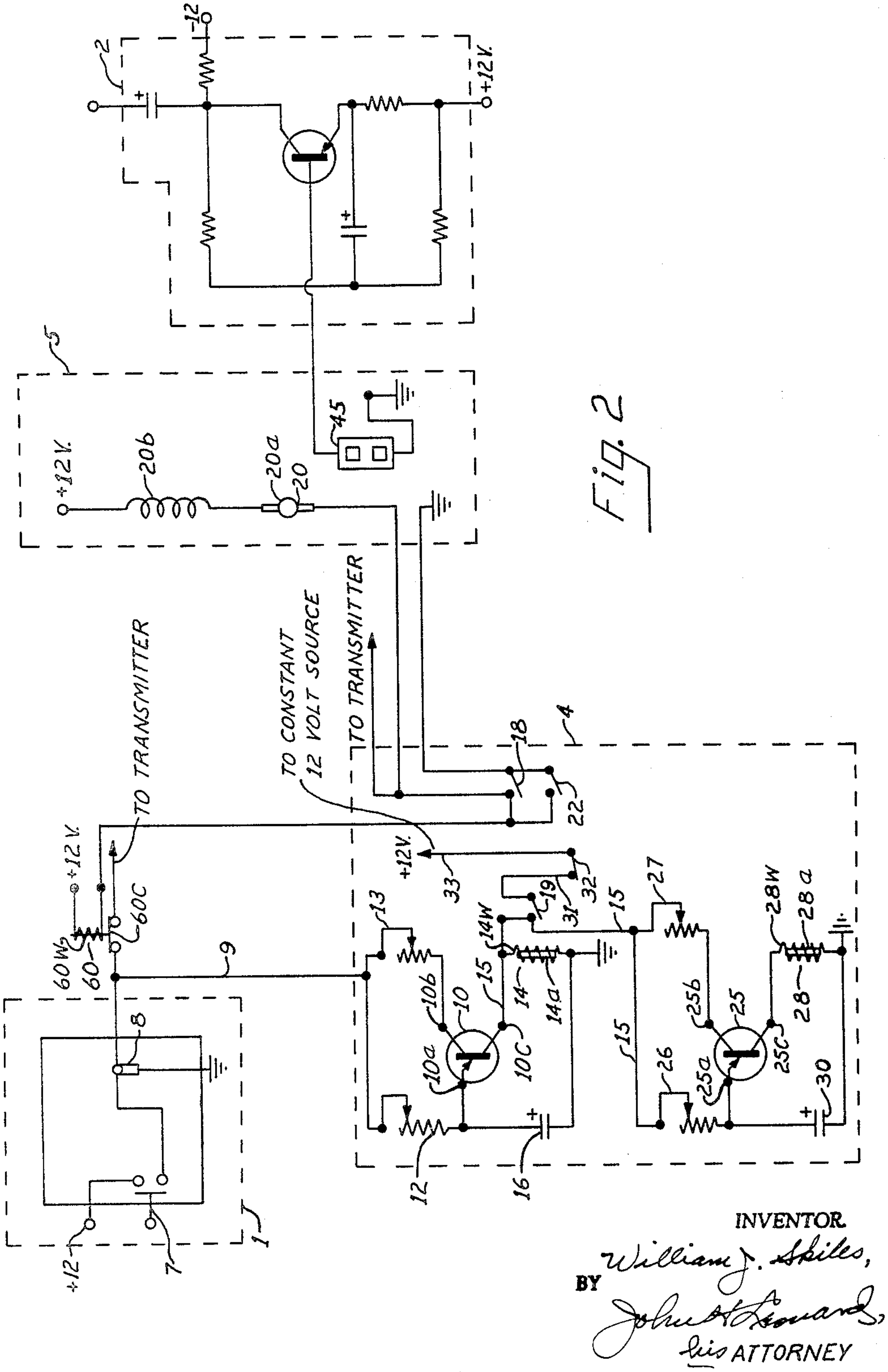
FIG. 2 is a more detailed wiring diagram showing the time delay circuit interconnecting the microphone push-to-talk switch of the transmitter and the identifier.

Referring to FIG. 2, the microphone circuit 1 includes a push-to-talk button 7 and a pilot indicator bulb 8 which, upon pushing of the push-to-talk button, is connected at one terminal to the positive side of a 12-volt direct current source of power of the microphone circuit. The other terminal of the bulb 8 is grounded. The positive terminal of the pilot indicator bulb is connected by a conductor 9 to the time delay switching mechanism 4.

The time delay mechanism comprises a unijunction transistor 10 having an input terminal 10*a* connected to the positive side of the source by the conductor 9 through an adjustable resistor 12; a biasing terminal 10*b* connected to the positive side of the source by the conductor 9 through an adjustable resistor 13; and an output terminal 10*c* connected to one terminal of a winding 14*w* of a relay 14, having an armature 14*a*, by a conductor 15. The other terminal of the winding 14*w* is connected to ground.

Connected in parallel relation between terminal 10*a* of the transistor 10 and the grounded terminal of the winding 14*w* is a capacitor 16, the rate of charge of which is controlled by the resistor 12. The greater the resistance of the resistor, the longer is the charging time of the capacitor, and hence the longer the time delay occasioned thereby. When the capacitor 16 builds up to the firing voltage of the transistor 10, current flows through the transistor 10 and the winding 14*w* of the relay 14. Upon energization of its winding 14*w*, the relay 14 operates to close two normally open switches 18 and 19.

The identifier 5 has one terminal connected to the positive side of a 12-volt source. Closure of the switch 18 establishes a circuit to the identifier by connecting its other terminal to ground.

Establishment of the identifier circuit energizes a driving motor 20, having an armature 20*a* and field 20*b*, of the identifier.

A manual or foot operated switch 22 is connected in by-passing relation to the switch 18, and is arranged so that the operator of the vehicle can close it readily by hand or foot. It usually is located in the vehicle in a place such that its operation by the vehicle operator is not discernible.

Closure of the switch 22 connects the ground terminal of the identifier 5 to ground independently of the switch 18. Thus closure of the switch 18 or switch 22 causes energization of the identifier circuit.

As mentioned, however, it is desirable that the transmitter-receiver system function in its normal manner for transmission of messages of preselected duration, usually limited to a certain specific number of seconds, for example, 20 seconds. If the message is longer than 20 seconds, or the transmitter is energized, either accidentally or intentionally, for a longer period, the identifier must send a message to central station identifying the vehicle. However, the identifier must cease its operation after a predetermined time delay.

A cut-off time delay, therefore, is provided. This circuit is one which is controlled by the switch 19. In this circuit, a unijunction transistor 25 is provided and has an input terminal 25*a* which is connected to one terminal of the switch 19 through an adjustable resistor 26. The biasing terminal 25*b* of the transistor 25 is connected to the same terminal of the switch 19 through an adjustable resistor 27. The output terminal 25*c* of the transistor 25 is connected to one terminal of a winding 28*w* of a relay 28, having an armature 28*a*. The other terminal of the winding 28*w* is connected to ground.

Connected between the ground terminal of the winding 28*w* and the input terminal 25*a* of the transistor 25 is a capacitor 30. The transistor 25, resistors 26 and 27, and capacitor 30 correspond in operation, respectively, to the transistor 10, resistors 12 and 13, and capacitor 16, heretofore described.

One side of the normally open switch 19 is connected by the conductor 15 to the output terminal 10*c* of the transistor 10 as heretofore described. The same conductor 15 connects the same side of the switch 19 with the resistors 26 and 27.

The opposite terminal of the switch 19 is connected by a conductor 31 to one terminal of a normally closed switch 32. The opposite terminal of the normally closed switch 32 is connected to the positive side of the 12-volt circuit.

Accordingly, when both switches 18 and 19 are in their normally open positions, and the push-to-talk microphone circuit is energized, voltage is supplied to the resistors 12 and 13 and to the capacitor 16, and, after a predetermined time delay, the unijuncture transistor 10 fires. Upon firing of the transistor 10, the winding 14*w* of the relay 14 is energized and closes its normally open switches 18 and 19. Upon closure of the switch 18 the motor 20 of the tape identifier is energized. At the same times, upon closure of the switch 19 a holding circuit is established for the winding 14*w* through the normally closed switch 32, which is connected at one of its terminals by the conductor 31 to one terminal of the switch 19. The other terminal of the switch 32 is connected by conductor 33 to the positive side of the 12-volt source. However, when these circuits are established, the off-time delay is started due to the energization of the circuit including the transistor 25, the capacitor 30, the resistors 26 and 27, and eventually the relay 28.

After an off-time delay, which began by closure of the switch 19, the relay 28 opens the normally closed switch 32. When the switch 32 is opened, all circuits are opened, and the transmitter is off the air and so remains until the push-to-talk button 7 of the microphone circuit is operated to energize the transmitter circuit again by energizing the relay 6, or until the emergency switch 22 is closed.

Thus open pushing the push-to-talk button, the operator can talk for a limited number of seconds, and if he continues for a longer period, or if the circuit to the transmitter is energized for a longer period for any reason, the identifier becomes active. On the other hand, after the identifier becomes active and continues for a limited period, it ceases to operate, and the circuit is again returned to control by the push-to-talk switch.

Figure 3:
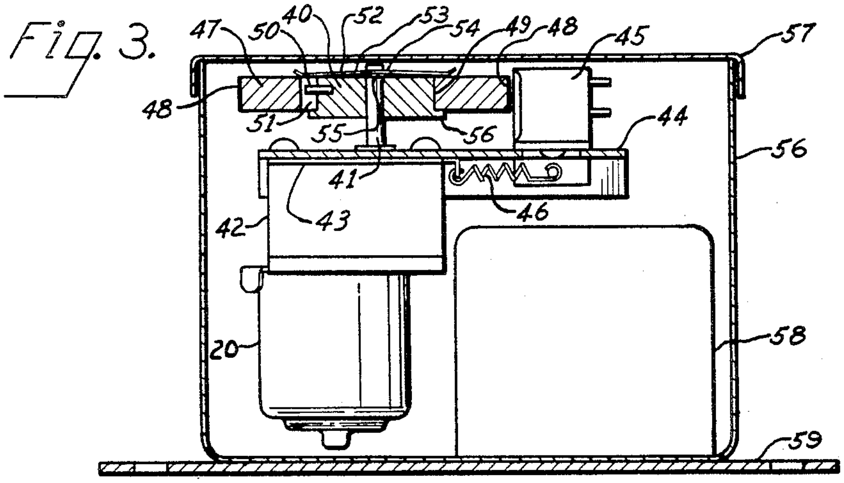
FIG. 3 is a front elevation of a preferred form of identifier of the present invention, part thereof being shown in section for clearness in illustration.
Figure 4:
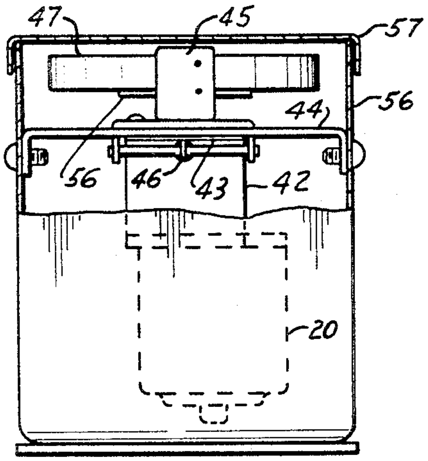
FIG. 4 is a right end elevation of the identifier illustrated in FIG. 3.
Figure 5:
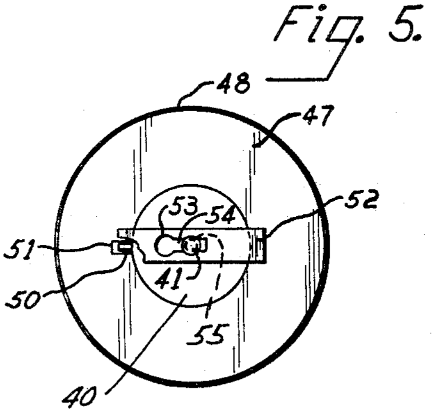
FIG. 5 is a fragmentary top plan view of the identifier showing the connection of the identifier disc to the turntable.

Referring next to FIGS. 3 and 4, the identifier itself comprises a turntable 40 which is carried on a shaft 41 of a reduction gear transmission 42, driven by the motor 20. Mounted on a housing portion 43 of the transmission 42 is a laterally extending bracket 44 on which is carried a conventional tape sound reproducing head or magnetic pick-up 45. The output of the head 45 is connected across the input of the audio-amplifier and the head can be energized by the magnetic signals from the identifier.

The head 45 is mounted for limited sliding movement toward and away from the periphery of the turntable 40, and is urged theretoward by a tension spring 46.

Detachably mounted on the turntable is a carrier disc 47 on the periphery of which is mounted a single layer of magnetic recording material, such as a strip 48 of magnetic recording tape. The tape is detachably held fixedly in place on the disc by suitable means, preferably by pressure sensitive adhesive. The disc has a central passage 49 which snugly accommodates the turntable 40. A suitable driving or limit pin 50 is provided on the turntable and engages an internal driving notch 51 in the inner periphery of the disc 47. The retaining spring 52, having a suitable opening 53 for receiving the outer end of the shaft 41, and adjacent thereto and connected therewith a notch 54, is provided. The notch 54 is such that when the shaft 41 is introduced in the opening 53 and the spring is slid slightly to the left in FIG. 3, the walls of the notch 54 are seated in a suitable groove 55 in the shaft 41. The outer ends of the spring bear against the disc 47 and hold it firmly against a radial flange 56 on the turntable.

Thus, in operation, the pick-up 45, having a conventional circuit, is energized by the tape when the motor 20 drives the tape. The pick-up 45 repeats the message on the tape 48 at least once for each complete rotation of the turntable 40.

With the reduction gear transmission employed, using a 2-inch disc rotating at 11 r.p.m., a message of 5½ seconds duration may be obtained for selected time cycle. Using a 4-inch disc rotating at 7 r.p.m., the duration and a different time cycle, a non-repeat longer message, for example 1.8 minutes, may be obtained.

Further, if desired, the disc 47 can be removed and replaced by another disc with a different selected message.

The structure described is enclosed in a suitable housing 56 having a cover 57. The time delay switch mechanism 4 of the present invention, heretofore described, may be enclosed in a suitable sub-housing 58 mounted in the housing 56 and carrying a flange 59 by which the identifier and its timing circuit may be installed as a unit in a selected vehicle. Consequently, the identifier unit can be sold in a compact form readily installable in a vehicle.

If it is desired to disconnect the microphone circuit 1 from the transmitter 3 when the identifier 5 is operative, a relay 60 having a winding 60*w* and normally closed contacts 60*c* may be interposed between the microphone circuit 1 and the transmitter 3. The microphone circuit is thus normally connected to the transmitter through the contacts 60 so long as the winding 60*w* is deenergized.

One terminal of the winding 60*w* is connected to the positive 12-volt source. The other terminal is connected to the switch 18 in a manner, as shown, such that closure of the switch 18 connects said other terminal of the winding 60*w* to ground for energizing the winding 60*w* and causing it to open the contacts 60*c*. With the relay 60, closure of the switch 18, as described, causes operation of the identifier 5 and disconnection of the microphone circuit from the transmitter, so that an operator cannot interfere, by using the microphone, with a message from the identifier 5.

It is to be understood that the transmitter 3 and the microphone circuit 1 are conventional equipment wherein the transmitter 3 is turned on by the operator by a suitable relay and manual switch, and the pushbutton of the microphone circuit is then operated for connecting the microphone to the transmitter when it is desired to talk. The present structure is auxiliary to the conventional microphone-transmitter circuit and does not interfere in any way with the normal operation thereof. The present circuit is energized by the operation of the pushbutton, or upon energization of the microphone circuit by any cause, and, when energized, after the normal time interval for a message, becomes operative to give its identifier message for a limited period and then discontinues the message.

Having thus described my invention, I claim:

1. An identifier comprising a rotatable member rotatable about a predetermined axis;

an electric motor to rotate the member about said axis;

magnetic recording substance carried by the member in a fixed position thereon for rotation therewith in a fixed path which extends generally circumferentially of said axis;

a magnetic pick-up means disposed in scanning relation to said path for picking up a message magnetically recorded by said substance;

an energizing circuit connected to the motor;

switch means in the circuit for connecting the circuit to, and disconnecting the circuit from, a source of power, selectively;

time delay means in the circuit operative to disconnect the circuit from the source at the end of a predetermined time interval following energization of the circuit.

2. The structure according to claim 1 wherein a second time delay means are provided in the circuit and are operative for connecting the circuit to the source at the end of a predetermined interval following closure of the switch means.

3. The structure according to claim 1 wherein the recording substance is positioned on said member and relative to the pick-up so that upon repeated rotations of the member, the pick-up repeatedly scans the same path of recording substance and thereby repeats the same recorded message repetitively for repetitive complete rotations of the member.

References Cited

UNITED STATES PATENTS

| | | | |
|---|---|---|---|
| 2,468,224 | 4/1949 | Munson | 179—100.2 |
| 2,561,698 | 7/1951 | Hogan | 179—100.2 |
| 2,683,254 | 7/1954 | Anderson et al. | 179—100.2 |

BERNARD KONICK, *Primary Examiner.*

JOHN W. CALDWELL, *Examiner.*

J. R. GOUDEAU, *Assistant Examiner.*